(12) United States Patent
Norris et al.

(10) Patent No.: US 6,662,899 B2
(45) Date of Patent: *Dec. 16, 2003

(54) USE OF AUTONOMOUS MOVEABLE OBSTRUCTIONS AS SEISMIC SOURCES

(75) Inventors: Michael Norris, Cypress, TX (US); Peter Aronstam, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/860,680

(22) Filed: May 18, 2001

(65) Prior Publication Data

US 2002/0092701 A1 Jul. 18, 2002

Related U.S. Application Data

(63) Continuation-in-part of application No. 09/560,252, filed on Apr. 26, 2000, now Pat. No. 6,244,375, which is a continuation-in-part of application No. 09/620,824, filed on Jul. 21, 2000, now Pat. No. 6,456,566.

(51) Int. Cl.$^7$ ................................................. G01V 1/40
(52) U.S. Cl. ......................... 181/102; 181/112; 367/25; 166/250.01
(58) Field of Search ................................. 181/102, 108, 181/112, 122, 110; 367/25, 31, 37, 28, 29, 73, 911; 166/250.01, 313

(56) References Cited

U.S. PATENT DOCUMENTS

| | | | |
|---|---|---|---|
| 4,684,947 A | 8/1987 | Zimmer | |
| 4,808,996 A | 2/1989 | Zimmer | |
| 5,259,452 A | 11/1993 | Wittrisch | |
| 5,461,594 A | 10/1995 | Mougenot et al. | |
| 5,481,502 A | 1/1996 | Cretin et al. | |
| 5,550,785 A | 8/1996 | Laurent et al. | |
| 5,597,042 A | 1/1997 | Tubel et al. | |
| 5,721,538 A | 2/1998 | Tubel et al. | |
| 5,941,307 A | * 8/1999 | Tubel ........................ 166/313 |
| 6,065,538 A | * 5/2000 | Reimers et al. ........ 166/250.01 |

* cited by examiner

Primary Examiner—Khanh Dang
(74) Attorney, Agent, or Firm—Madan, Mossman & Sriram, P.C.

(57) ABSTRACT

One or more autonomous devices are deployed in the well to provide a moveable sensor source or obstruction for coupling a tube wave seismic signal into the formation adjacent the well bore. The autonomous devices move in the well and provide moveable obstructions or discontinuities which couple tube waves existing in the well bore or production tubing into the formation adjacent the well bore. Wellbore tube wave energy is converted to body wave energy at minor borehole obstructions or irregularities that become sources of seismic energy. A well bore may contain a plurality of minor obstructions or discontinuities. Each obstruction or discontinuity position along the borehole has an associated unique waveform source coda that may be measured for processing the wavefield radiated into the earth formation surrounding the well bore. A plurality of sensors detects the radiated seismic energy after the seismic energy has transited intervening earth formations. The system may be employed as a permanent monitoring device for mineral resource management so that measurements may be acquired at many different times. A time lapse profile may be created that is representative of the temporal and areal changes in the petrophysical characteristics and mineral content or distribution of the intervening earth formation.

28 Claims, 11 Drawing Sheets

USE OF AUTONOMOUS MOVEABLE OBSTRUCTIONS AS SEISMIC SOURCES

CROSS REFERENCE TO RELATED APPLICATIONS

This patent application is a continuation in part of U.S. patent application Ser. No. 09/560,252 filed on Apr. 26, 2000 now U.S. Pat. No. 6,244,375 entitled "System and Method for Performing Real Time Sesimic Surveys" by Mike Norris, et al. This patent application is also a CIP of U.S. patent application Ser. No. 09/620,824 filed on Jul. 21, 2000 now U.S. Pat. No. 6,456,566 entitled "Use of Minor Borehole Obstructions as Seismic Sources" by P. Aronstam.

BACKGROUND OF THE INVENTION

1. Field of the Invention

This invention relates generally to the production of hydrocarbons from subsurface formations and to in-hole seismic data acquisition to map advancing fluid fronts and the depletion of hydrocarbons within a hydrocarbon producing formation around a single well bore or outside a well bore on the surface of the earth or on the ocean bottom. The invention relates specifically to an autonomous carrier providing a movable obstruction, the carrier providing a seismic source or a discontinuity or obstruction to convert tube waves to body waves, the carrier being movable inside and outside the well bore and on the earth's surface or on the ocean bottom.

2. Description of the Related Art

In order to relatively precisely map advancing fluid fronts within a field or around a single well bore requires the use of deep reading measurements at spatial resolutions of less than five (5) meters but with the spatial extents of several hundred meters, depending upon the reservoir location, size and the number of wells in the field. Conventional three dimensional ("3D") seismic acquisition and repeated 3D seismic acquisitions (also referred to as the 4D seismic acquisition) and seismic data acquisition techniques known as vertical seismic profiling ("VSP"), 3D VSP and Reverse VSP or Reverse 3D VSP are often utilized to model the reservoirs and/or to determine the advancing fluid fronts in the producing formations. The conventional 3D and 4D surface seismic acquisitions are performed by deploying detectors at or near the earth's surface and the survey area is usually substantially large. The conventional 3D and 4D surveys provide data with limited spatial resolution and no near real-time ability to utilize results because of the lengthy time span required to acquire and process the data, which can take several months. The subsurface VSP and 3D VSP also suffer from long data processing cycles and have limited spatial extent. Water breakthrough can occur rapidly, especially after a new horizontal well is drilled. Reservoir engineers can take timely action if timely fluid front information is available.

Another related problem is the expense of acquiring repeat 3D seismic data over a relatively small geographical area, such as between 10–20 $Km^2$. The current seismic surveying vessels using surface towed cables are designed to acquire vast volumes of data over a large region. Ocean bottom cable surveys, wherein seismic sensor or detector cables are deployed on the sea bottom, provide an alternative surveying method but are more expensive than the towed streamer cable acquisition methods.

The term "signature" as used herein, means the variations in amplitude, frequency and phase of an acoustic waveform (for example, a Ricker wavelet) expressed in the time domain as displayed on a time scale recording. As used herein the term "coda" means the acoustic body wave seismic energy imparted to the adjacent earth formation at a particular location. The coda associated with a particular seismic energy source point or minor well bore obstruction in this invention will be the seismic signature for that seismic energy source point. The term "minor borehole obstruction", "obstruction", "borehole discontinuity" or "discontinuity" means an irregularity of any shape or character in the borehole such that tube wave energy transiting the wellbore will impart some energy to the irregularity in the borehole and thus radiate body wave energy into the surrounding earth formation while also transmitting and reflecting some the tube wave energy as well.

The term "impulse response" means the response of the instrumentation (seismic sensors and signal processing equipment) to a spike-like Dirac function or impulse. The signal energy of an acoustic wave field received by seismic sensors depends upon the texture of the rock layers through which the wave field propagated, from which it was reflected or with which it is otherwise associated, whether along vertical or along lateral trajectories. The term "texture" includes petrophysical parameters such as rock type, composition, porosity, permeability, density, fluid content, fluid type and inter-granular cementation by way of example but not by way of limitation.

From the above considerations, it is reasonable to expect that time-lapse seismic monitoring, that is, the act of monitoring the time-varying signature of seismic data associated with a mineral deposit such as an oil field over a long period of time, would allow monitoring the depletion of the fluid or mineral content, or the mapping of time-varying attributes such as the advance of a thermal front in a steam-flooding operation.

Successful time-lapse monitoring requires that differences among the processed data sets must be attributable to physical changes in the petrophysical characteristics of the deposit. This criterion is severe because changes in the data-acquisition equipment and changes in the processing algorithms, inevitable over many years may introduce differences among the separate, individual data sets from surveys that are due to instrumentation, not the result of dynamic reservoir changes.

In particular, using conventional surface exploration techniques, long-term environmental changes in field conditions such as weather and culture may affect the outcome. If time-lapse tomography or seismic monitoring is to be useful for quantitative oil-field reservoir monitoring, instrumentation and environmental influences that are not due to changes in reservoir characteristics must be transparent to the before and after seismic data sets. Successful time-lapse tomography requires careful preliminary planning.

One way to avoid many time-dependent environmental changes and updated state-of-the-art instrumental changes is to permanently install seismic sources and seismic detectors in one or more boreholes in and around the area of economic interest. Identical processing methods are applied to the data throughout the monitoring period using cross-well (cross-borehole) tomography rather than conventional surface type operations. One such method is disclosed in patent application Ser. No. 08/949,748, filed Oct. 14, 1997 and assigned to the assignee of this invention and which is incorporated herein by reference as a teaching of cross-well tomography.

U.S. Pat. No. 5,406,530, issued Apr. 11, 1995 to Tokuo Yamamoto, teaches a nondestructive method of measuring physical characteristics of sediments to obtain a cross sectional distribution of porosity and permeability values and variations and of shear modulus and shear strength. A pair of bore holes has bore hole entries spaced apart from each other at a predetermined distance and a plurality of hydrophones are spaced at predetermined known locations. A pseudo random binary sequence code generator as a source of seismic energy is placed in another bore hole and activated to transmit pseudo random wave energy from the source to the hydrophones. Seismic wave characteristics are measured in a multiplicity of paths emanating from the source to the hydrophones using cross-well tomography.

The Yamamoto teaching is primarily directed to use in shallow bore holes for engineering studies. Such holes are less than 100 meters deep, as opposed to oil-field bore holes, which may be two to five kilometers deep. The requirement for an active source to be placed at various levels in the bore hole is problematic because the source can damage the hole and interfere with production. Since the seismic equipment must be moved up and down the bore hole, it is difficult, using conventional methods, to precisely locate and/or position seismic equipment to maintain identical recording conditions over an extended time period.

G. W. Winbow in U.S. Pat. No. 4,993,001 issued Feb. 12, 1991, describes a method and apparatus for converting tube waves into down hole body waves for seismic exploration. The equipment comprises a rotary-valve tube wave source for producing swept-frequency tube waves that are injected into tubing or well bore fluid. The tube waves are converted into body waves by an elongate tube wave converter located at a selected position down hole. The tube wave converter comprises an elongate body that preferably substantially fills the well bore or tubing and has a preferred shape in order to efficiently convert the tube waves to body waves at the selected position downhole. This patent is directed primarily to reverse VSP. Winbow acknowledges that it is well known in the art that "nonuniformities in the borehole" cause seismic-wave mode conversions that cause secondary acoustic radiation and associated multiples.

Winbow employs a single tube-wave converter to serve as a single source of direct and reflected seismic waves but Winbow must repeatedly reposition the device at spaced-apart intervals down the length of the bore hole to obtain extended vertical coverage as in cross-well tomography. The Winbow system, thus is difficult to implement for the fixed permanent instrumental installation required for 4-D seismic monitoring operation.

There is a need for a passive system of benign seismic sources that can be easily and precisely moved around inside and outside of the bore hole on the earth's surface or the ocean bottom and designed for monitoring time-varying reservoir attributes such as the distribution of the contents of a mineral deposit. There is also a need for an autonomous carrier for operation inside and outside of the borehole.

SUMMARY OF THE INVENTION

The present invention provides systems and methods for acquiring seismic data by deploying movable clusters of seismic obstructions and detectors in wells to generate acoustic signals and acquire data as needed. Such a system provides seismic data with relatively high spatial resolution and with small spatial extent. Because of the relatively small number of detectors and geometry of deployment, the data can be processed substantially in real-time and utilized to provide 4D maps of the advancing fluid fronts. Use of such systems in multiple wells in a common field can provide maps of the advancing fluid fronts and hydrocarbons within that field.

In one aspect, this invention provides a near real-time system and method for acquiring seismic data in reservoirs at very high spatial resolution such that advancing fluid fronts and hydrocarbons can be mapped substantially in real time. The system enables large spatial extents to be investigated at arbitrarily fine spatial intervals or resolution. In one system, one or more autonomous devices are deployed in the well to deploy movable obstructions, spaced to convert unique acoustic tube waves to body waves that radiate into a formation adjacent the well bore. Autonomous carriers deploy seismic receivers and may also deploy an acoustic energy source. The device may include multiple spaced-apart receivers. An acoustic source or naturally occuring fluctuations in production flow transmit energy into the well bore or production tubing to supply tube waves for conversion to body waves by the movable obstructions.

The autonomous devices move in the well and provide discontinuities that convert tube waves into a uniquie series of body waves that radiate into the formation. Seismic sensors or receivers detect seismic waves traveling to the receivers at known discrete locations in the well. The receiving devices store the seismic data in on-board memory. After the data acquisition, the devices dock at receiver stations in the well. The receiver stations provide power to the devices and download the stored data from the memory. A two-way data link between a surface control unit, such as a computer system, and the down hole receiver is used to transmit data from the receiver to the surface computer. The surface computer system also sends command signals to the down hole carriers to control the location and operation of the individual devices deployed on the carriers. The receiver stations are programmed to control the operation of the devices deployed on the carriers, which may include resident programs to perform the survey operations at specified intervals.

The data gathered by the devices is used to update existing seismic maps in determining the boundary conditions of the fluid fronts and the depletion of hydrocarbons. The amount of seismic data is relatively small compared to conventional seismic methods, such as surface seismic methods using land cables or streamer cables. Thus, the data can be processed to update the prior 3D data to locate fluid fronts and hydrocarbons, substantially in real time. The data collection spacing defines the spatial resolution, which is selected by the operator based upon the needed resolution.

In an alternative method, autonomous carriers are deployed in the well bore and at or near the sea bottom. The devices travel along predefined paths at the sea bottom and inside and outside of the wells carrying seismic sources, providing discontinuities inside the well bore, to convert tube waves into body waves, providing seismic sources or providing receivers for collection of seismic data. Tracks are used to guide the autonomous devices in the wells and along the ocean bottom. Coiled tubing laid at the ocean bottom may be used as tracks. A subsea control station or receiver station provides power and data transmission function for the subsea devices. A source on a vessel may be used to induce acoustic tube wave energy into the subsurface formations. The data from both the wells and the sea bottom is then used to update the 3D maps to obtain 4D maps and to model the reservoirs.

The present invention provides an autonomous carrier acoustic system and method for providing an acoustic source or a moveable obstruction for radiating a wave field into an earth formation surrounding at least a first source bore hole containing a column of well bore fluid. A movable acoustic driver is provided for exciting a reverberating tube wave in the column of well bore fluid. In the alternative the naturally occurring production flow fluctuations provide a tube wave. A plurality of movable autonomous carriers are arbitrarily spaced in the bore hole to provide discontinuities or minor obstructions or irregularities in well bore fluid column. The present invention can be utilized to deploy a plurality of moveable obstructions can be deployed simultaneously in a plurality of wells in an oil field. See, e.g., U.S. Pat. No. 5,886,255. The autonomous carriers also carry seismic sources or other devices inside or outside of the borehole. Each autonomous carrier inside the borehole or production tubing provides a discontinuity or minor bore hole obstruction that forms a point source for diffractively radiating an acoustic wavefield into the surrounding formation. The discontinuities or minor obstructions intercept the tube wave as the tube wave transits the column of well bore fluid or the fluid inside of a production tubing. The resulting plurality of acoustic wave fields, each exhibiting a unique waveform coda, is thereby radiated into the formation. An acoustic sensor in association with one or more said discontinuities or minor bore hole obstructions detects the unique waveform coda characteristic of each of the respective wave fields to provide a plurality of uniquely encoded pilot signals. In a preferred embodiment, a sensor is collated with a movable obstruction source to determine the coda associated the with the movable obstruction.

A plurality of sensors for detecting seismic energy separated from the source borehole by an intervening earth formation is provided. The plurality of seismic receivers, for receiving the plurality of acoustic wavefields radiated from the source borehole after the wavefields have propagated through the intervening earth formation, may be in another borehole or on the surface of the earth. The receivers are also carried on autonomous carriers. A cross correlator is provided for cross correlating the respective uniquely encoded pilot signals with a corresponding received acoustic wavefield to furnish a cross correlogram that is indicative of the current value of the preselected attribute. A time-lapse profile is created that is representative of the temporal changes in the petrophysical characteristics and mineral content or distribution of the intervening earth formation by repeating the process at subsequent time intervals.

Examples of the more important features of the invention thus have been summarized rather broadly in order that the following detailed description thereof may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DETAILED DESCRIPTION OF A PREFERRED EMBODIMENT

The present invention functions in at least two distinct but related modes for using autonomous carriers to convert acoustic tube waves into body waves or provide sesimic sources deployed by autonomous carriers. The first mode provides a near, real-time method to acquire seismic data in and/or above a reservoir at very high spatial resolution such that advancing fluid fronts and hydrocarbons can be detected. The second mode provides an alternative method of acquiring repeat 3-D seismic surveys over small areas. Both methods enable investigation of large spatial extents at arbitrarily fine spatial intervals.

Figure 1:
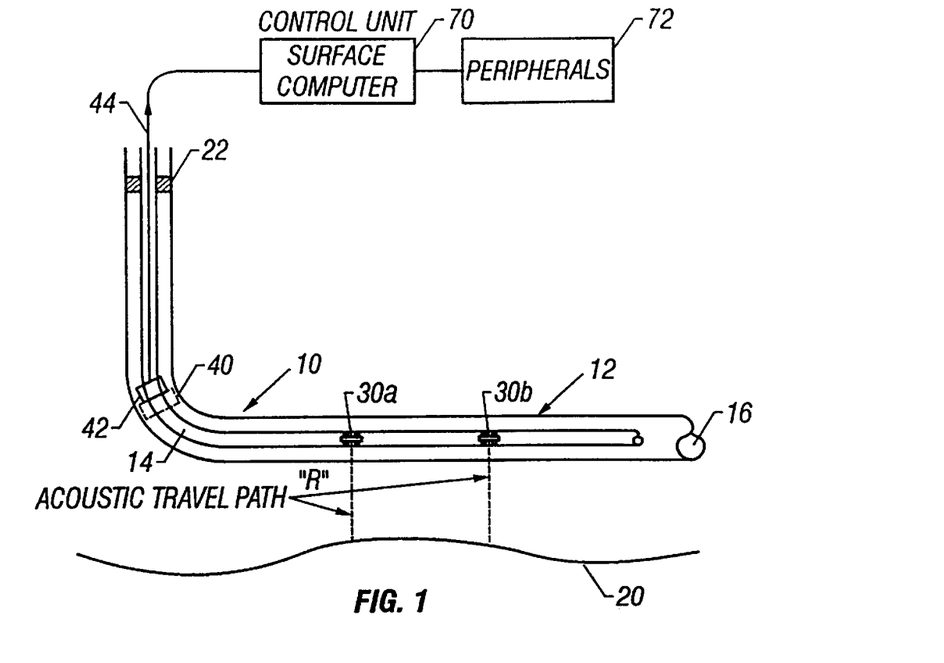
FIG. 1 is a schematic diagram of a production well wherein autonomous devices move inside a well bore or a production tubing to provide seismic sources, discontinuities or sensors to gather data at discrete locations in the well.
Figure 2:
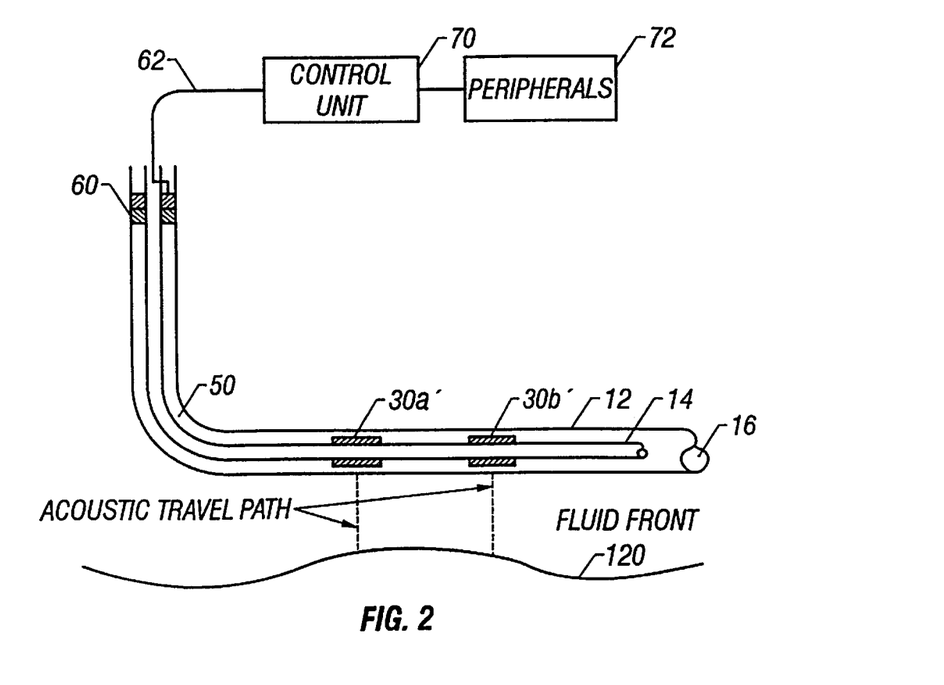
FIG. 2 is a schematic diagram of a production well wherein autonomous devices move in an annulus between the production tubing and the casing to provide seismic sources, discontinuties or sensors at discrete locations.

The system and methods of the present invention may be utilized for subsurface (i.e. in-hole), earth surface applications and ocean bottom applications. FIGS. 1 and 2 illustrate examples of in-hole applications. FIG. 1 is a schematic diagram of a production well 10 that is producing hydrocarbons from a reservoir $R_1$. The well 10 is shown to include a horizontal section 12 formed in the reservoir R. The well 10 is lined with a casing 16. A production tubing 14, disposed in the well 10 and extending to the surface, transports the fluid from the reservoir R to the surface. A packer 22 seals the annulus 24 between the casing 16 and the tubing 14, which ensures the flow through the tubing 14. As the reservoir is depleted, the fluid front 20 starts to approach the well 10. As noted above, it is important to know the location of the fluid front 20 substantially in real-time, so that the well operator can control the production from the reservoir R. To collect seismic data and provide seismic sources or obstructions for converting tube waves in the tubing 14 into body waves coupled into formation adjacent the well bore 10, one or more autonomous moveable obstruction source receiver devices 30a–30b are launched into the well 10. Each such device comprises a moveable obstruction, one or more seismic receivers or a source of acoustic energy. The device may include a plurality of spaced-apart receivers/sensors.

Each receiver may be made up of one or more individual sensors, such as a hydrophone. The devices 30a–30b, may be permanently resident or moveably deployed in the well 10. Each such device is adapted to traverse a portion of the well or the entire well 10. The carrier tracks or production tubing may also protrude outside of the wellbore. The devices 30a–30b can be located in a fixed position or can move along the well 10 at a preselected constant speed. The travel speed is selected so that the data integrity is not compromised. The data may also be gathered at discrete, stationary intervals. Each receiver device preferably includes electronic circuitry and associated memory to store the seismic data in the memory. The stored data may be retrieved at the surface upon the return of the autonomous moveable obstruction source/receiver devices 30a and 30b to the surface. Alternatively, a data collection station 40 may be provided in the well 10. The autonomous moveable obstruction source/receiver devices 30a and 30b programmatically or upon the issuance of a command from the surface move to and dock at the data collection station 40, to transfer the stored data to a data receiver 42 or to import instructions or provide power to the carrier device. The receiver 42 transmits the retrieved data to the surface via a telemetry line 44. Each autonomous source/receiver device 30a–30b may include sensors that act as single point sensors or as continuous or discrete, spatially distributed sensors. For example, each autonomous moveable obstruction source/receiver 30a and 30b may carry a plurality of spaced apart seismic sensors, each sensor made up of a set or group of hydrophones, each set acting as a single data point. Multiple hydrophones are commonly used in seismic surveys to combine their detected signals to improve signal to noise ratio of the output.

To obtain seismic survey, acoustic energy is generated at known locations relative to the receivers 30 provided by autonomous moveable obstruction source/receiver devices 30a and 30b. For receiver configuration of FIG. 1, the acoustic energy sources can be carried by the autonomous moveable obstruction source/receiver devices 30a and 30b, located at known surface locations. The acoustic energy also may be generated by the fluid flow in the production tubing or in the well and incident upon a movable obstruction placed therein. The acoustic energy is converted into body waves by moveable obstructions attached to autonomous carriers or autonomous moveable obstruction source/receiver 30a and 30b. The carriers themselves may act as moveable obstructions. In the latter case, additional, focused or known signals as well may be obtained by placing carrier-borne obstructions or signal generators in the flow path of the production tubing or well bore. The autonomous moveable obstruction source/receiver devices 30a and 30b are precisely positioned along the well 10 to ensure that repeat surveys can be acquired at the same locations. This can be done by using the casing/tubing collars as the markers or by other known techniques, such as using induction devices or radio frequency transmitters. In the well bore configuration of FIG. 1, the autonomous moveable obstruction source/receiver devices 30a and 30b move on attached autonomous carries inside the tubing 14, which may be a production tubing, injection tubing or a tubing utilized for monitoring the well 10.

FIG. 2 shows an alternative positioning of the autonomous devices for gathering the seismic data and providing moveable seismic sources or discontinuities. In this configuration, the autonomous moveable obstruction source/receiver devices 30a and 30b reside in the annulus 50 between the casing 12 and the tubing 14. The autonomous moveable obstruction source/receiver devices 30a and 30b may move freely in the annulus 50 or on a track associated with the tubing or use the tubing 14 itself as the track.

Figure 3:
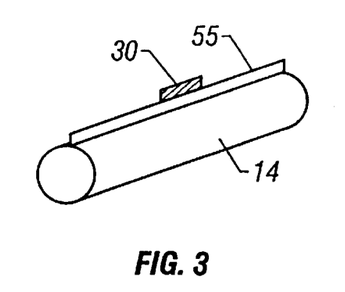
FIG. 3 shows a configuration of a track on the production tubing for the autonomous devices.

FIG. 3 shows the tubing 14 with a track 55 on its outside. The autonomous moveable obstruction source/receiver device 30 has matching tracks that interlock with the tracks 55 but allow the device 30 to freely move in either direction on the track 55.

Figure 4:
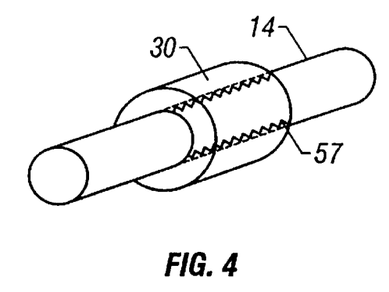
FIG. 4 shows an alternative method of moving the autonomous devices outside a tubing.

FIG. 4 shows a configuration wherein the device 30 uses the tubing 14 as the track. The device 30 may use all or a portion of the outside radial surface as track. The device 30 has travel mechanism 57 that enables it to travel on the outside of the tubing 14 in either direction. As shown in FIGS. 1 and 2, when the devices 30a and 30b reside in the annulus 50 then the receiver station 60 can be conveniently located adjacent the packer 22. The devices 30a and 30b travel in the annulus 50 and provide moveable obstructions, seismic sources or seismic sensors to gather data at discrete spaced-apart locations and then return and dock at the receiver station 60. The receiver station 60 retrieves the data from the devices 30a and 30b and transmits the received data to the surface via a telemetry line 62. The receiver 60 provides power and instructions received from a surface control unit 70 (see FIGS. 1 and 2). The control unit 70 is preferably a computer system, which may be located at the well site or at a remote location, such as an office. The data from the well site may be transmitted to the control unit 70 by satellite or other methods. The control unit 70 provides associated peripherals 72, such as memory units, recorders, display monitors, etc. The control Unit 70 is programmed to control the operation of the devices 30a and 30b via telemetry links, such as 44 (FIG. 1) and 60 (FIG. 2). An operator may send command signals via the control unit 70 to the receiver station, which in turn controls the devices 30. The operator can select the location of the carrier-borne discontinuities, seismic sources or the data collection locations for seismic sensors and the data gathering interval at such locations. Alternatively, each device 30 may be programmed to locate a source, discontinuity or sensor to collect data at spaced intervals in the well 10 and periodically return to the receiver station to unload the data, receive instructions or to recharge the batteries. The devices 30 can be reprogrammed by the receivers 40 or 60. The remote unit 70 can command the discontinuities, seismic sources or receivers to change the programs of the devices 30. Such a system is very flexible, in that the data can be gathered routinely according to the programs stored in the autonomous devices 30, but which can be changed at any time from the surface. Instructions may be transmitted to the device 30 via fluid pulses, acoustic pulses, radio frequency transmission, via a carrier track or electromagnetic pulses.

Multiple devices autonomous autonomous moveable obstruction source/receiver devices 30 can operate from and/or reside at each receiver station by daisy-chaining the power, telemetry and command busses through the devices. Daisy chaining or cascading the buses enables power, data and command signals to pass between the receiver and each of the devices. Each device is provided with an identification code or address so that the receiver station can directly communicate with a particular device to the exclusion of the other devices in the group. This arrangement enables the use of an arbitrary number of devices and the use of redundant devices. When a particular device fails or loses power, it is programmed to go into a neutral mode that enables it to be moved along the tubing or track by the other devices and used as a passive feed through for power, command signals and data transfer.

In addition to providing sensors for acquiring seismic data, the autonomous moveable obstruction source/receiver device(s) 30 may include sensors to acquire other information, including pressure, temperature, fluid flow as velocity within the tubing 14, and material build-up within the tubing 14.

Figure 5:
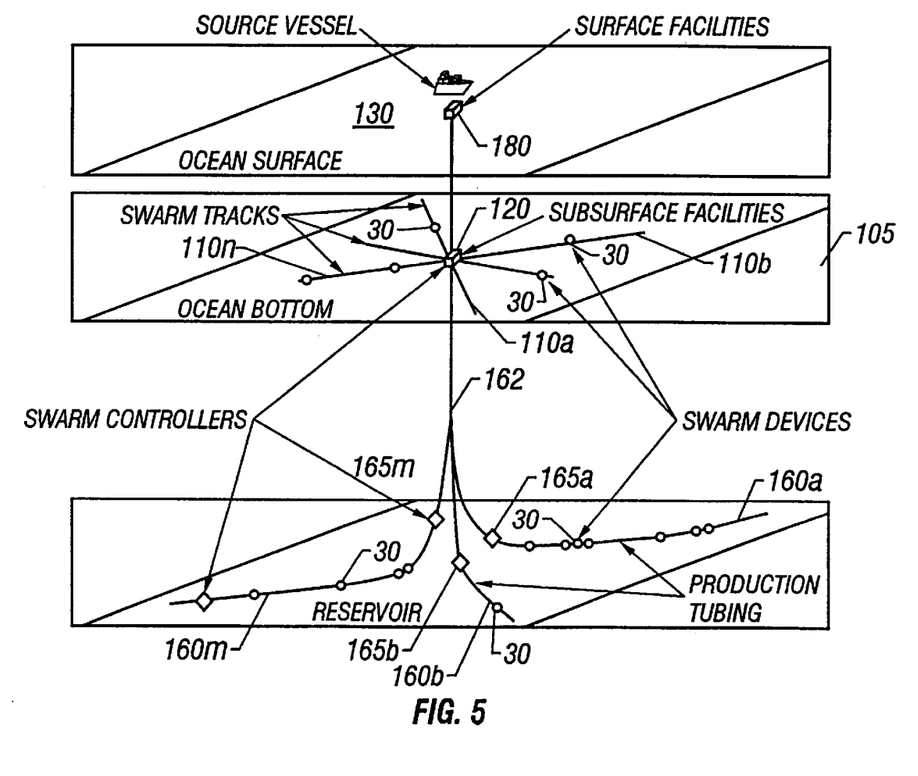
FIG. 5 is a schematic illustration of a layout for ocean bottom and subsurface deployment of the autonomous devices according to one method of the present invention.

A large percentage of well bores are now being drilled in deep water, often deeper than 2000 feet. Some wells have been drilled or are planned for drilling in water depths exceeding 5000 feet. Seismic surveys using seismic sensor cables deployed at sea bottom are increasingly being used as this method allows placing seismic detectors closer to the subsurface reservoirs. The autonomous devices 30 of the present invention may be deployed at ocean bottom providing a source or a sensor for gathering seismic data. FIG. 5 shows an exemplary layout for using the autonomous devices 30 according to one method of the present invention. A plurality of tracks 110a–110n is laid at or below the ocean bottom 105 from at least one ocean bottom control station or unit 120. The tracks 110a–110n are shown radially extending from the control station or units 120. The tracks may also be laid as a grid or in any other suitable configuration. A surface vessel 130, seafloor crawler, or other fixed or moveable subsea device carries the acoustic energy source(s). The acoustic energy is generated at known locations as the vessel is moved. The tracks 110a–110n may be coiled tubings laid on the sea bed 105. Continuous coiled tubings are commercially available and are transported on reels. The devices 30 move inside the coiled tubings. Alternatively, exposed tracks may be used. Each device 30 may represent a single point source/receiver or a single point receiver that traverses a defined segment of the sea bed to acquire data. This method allows an operator to focus the device 30 at required spatial distribution to achieve the resolution required for reservoir monitoring. Regardless of the deployment method, a suitable method is used to accurately determine the position of each location where the device 30 acquires data, provides an obstruction or sends out a seismic source signal.

The ocean bottom deployment of autonomous devices 30 may be augmented with subsurface deployment of these devices. As shown in FIG. 5, the autonomous moveable obstruction source/receiver device 30 is deployed in the various lateral wells 160a–160m drilled from a vertical well or main well 162 extending to the ocean bottom 105. The device 30 in each subsurface well communicates to a control unit receiver. For example the device 30 in the well 160a communicates with a central unit 165a while device 30 in wells 160b and 160n respectively is in communication with the control units 162b and 162m. The devices in the subsurface operate in the manner described above with respect to FIGS. 1 and 2.

In the configuration of FIG. 5, the device 30 in subsurface wells 160a–160m acquires data at defined discrete locations and passes the acquired data to their respective or associated control units 165a–165m, which in turn transmit the data to a surface control unit 180 via the ocean bottom facility 120. A common acoustic energy source at the vessel 130 generates required acoustic energy or signals at predetermined surface locations. The device 30 detects reflected acoustic signals and transmits the acquired data to their respective or associated control units, which transmit the acquired data to a surface control unit 130. The surface unit may be located at the vessel 130 or at a remote site.

The data acquired by the above-described system and methods is provided to create or update 3D seismic maps and to obtain models of the reservoir $R_2$. The location of the seismic receivers or detectors 30 is relatively close to the subsurface reflection points (such as bed boundaries and fluid fronts) to provide higher spatial resolution. Since the amount of data gathered is relatively small as compared to surface seismic surveys, the data can be processed substantially in real-time, which enables near real-time reservoirs description, which is not feasible with the currently used surface seismic techniques. The autonomous device 30 of the present invention may also be used for special purposes, such as for setting distributed flow control devices, such as distributed sliding sleeves in a wellbore.

For the purpose of clarity and explanation, the method of this invention is further described by way of example, but not by way of limitation, with respect to cross-well tomography with receivers in bore holes as well as the earth surface. It is to be clearly understood that the method may be applied to any multi-channel data recording geometry or acquisition regime whether seismic sensors are in the subsurface, in well bores, or at or near the surface of the earth. Additionally, when the terms "bore hole obstruction" or "bore hole discontinuity" are used, they refer to any shape or character of location in a bore hole where tube wave energy is reflected, transmitted or converted to body wave energy.

An acoustic driver of any known type excites a tube wave that reverberates in a fluid filled bore hole. The tube wave energy transits along the fluid column. Part of the tube wave energy will be converted to body waves at well bore obstructions of any type. Body waves travel through earth formations and may be received at seismic receivers.

Figure 6A:
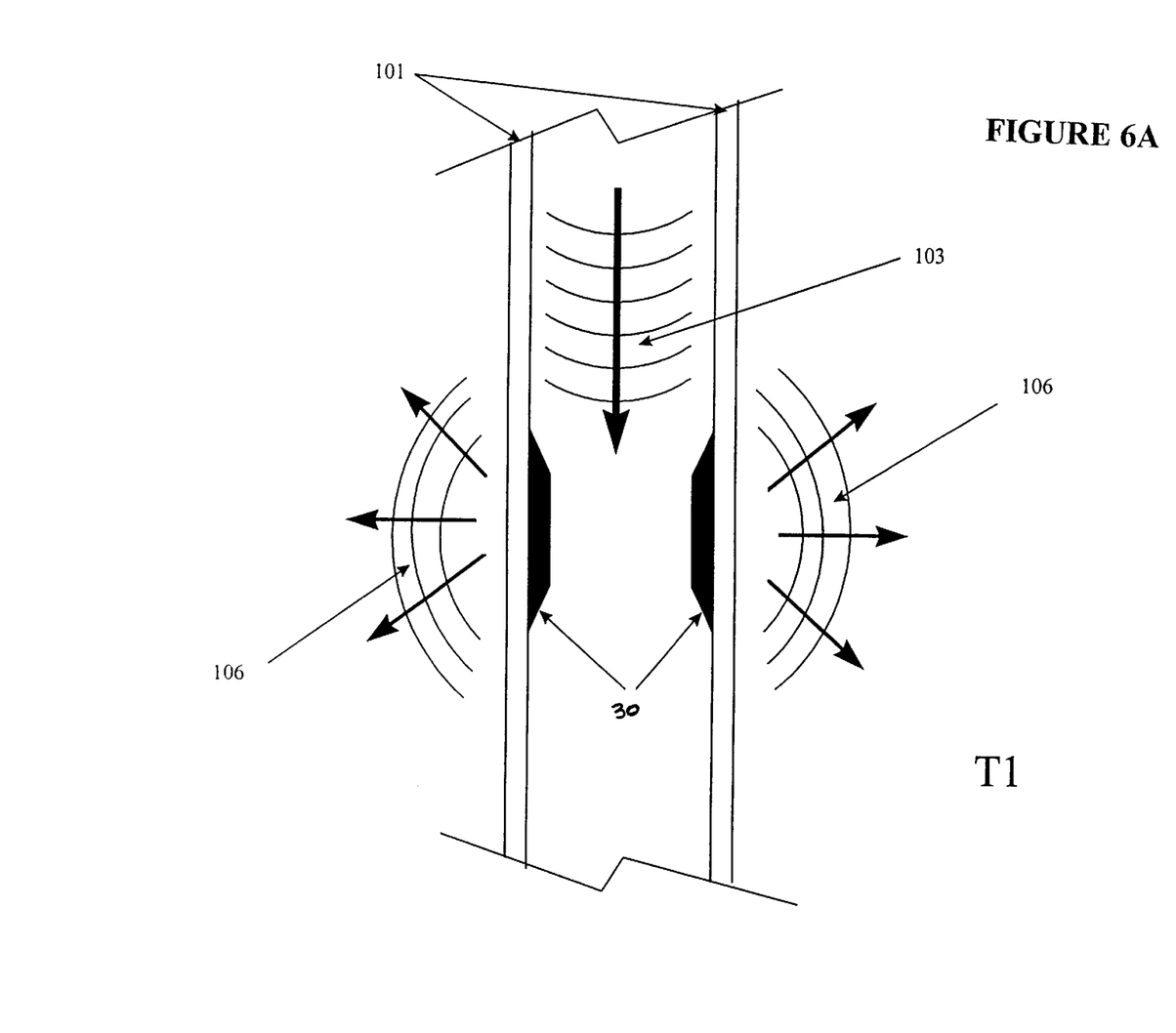
FIGS. 6A and 6B are a step-by-step diagram of tube wave propagation impinging on a discontinuity or minor bore hole obstruction to become a body wave.
Figure 6B:
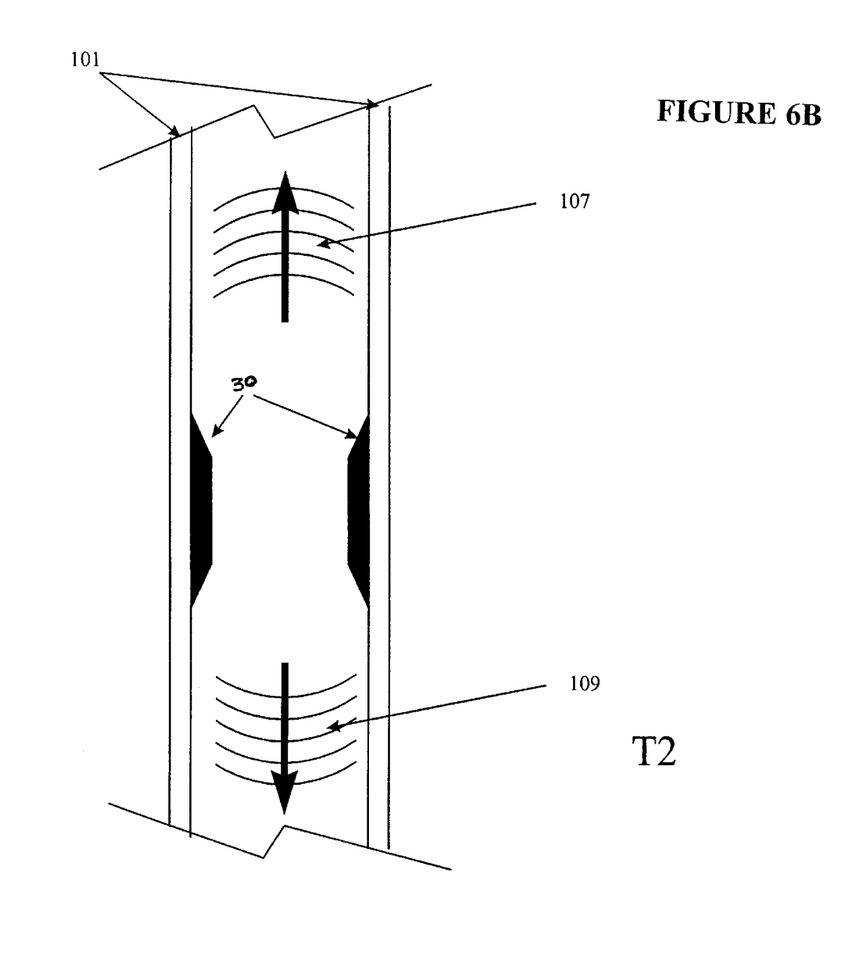

The conversion of tube wave energy to body waves as tube wave energy transits axially in a well bore is illustrated in FIG. 6A. Tube wave energy 103 transits directionally along a well bore or production tubing 101 as shown in cross-section in FIG. 6A. As the tube wave energy 103 impinges on a minor bore hole obstruction 30 of any type, in the well bore or production tubing, some of the energy is imparted to the obstruction at an arbitrary time T1. Some tube wave energy will be radiated out of the bore hole or production tubing and into the surrounding earth formation as body wave energy 106 at the location in the bore hole where the bore hole discontinuity 30 is present. Additionally, as shown in FIG. 6B at arbitrary time T2, some energy will be reflected back in the opposite direction the tube wave energy has just transited 107. Part of the energy 109 will also be transmitted and so continue transiting along the well bore or production tubing along the same direction as before the tube wave energy impinged on the obstruction.

Figure 7:
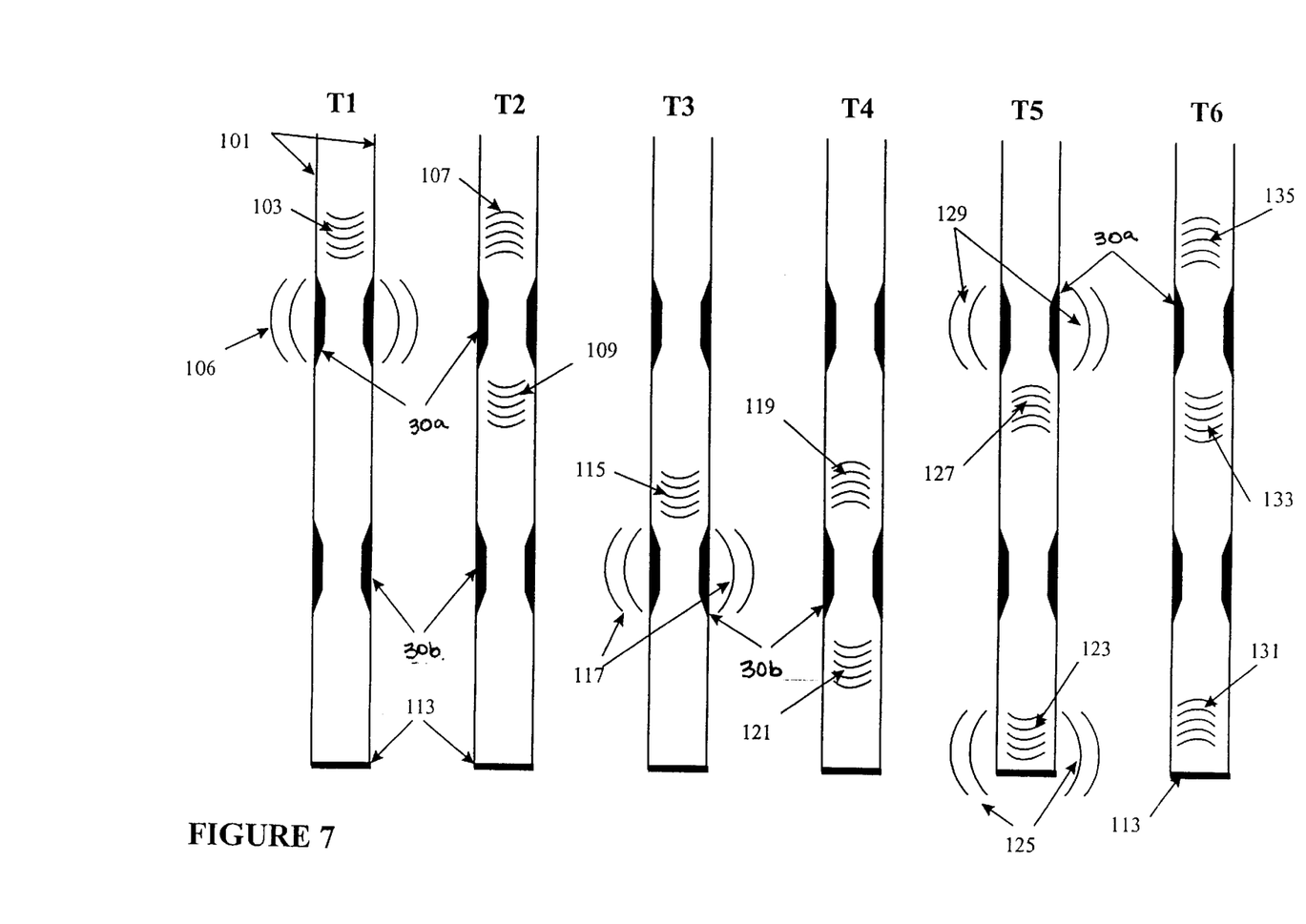
FIG. 7 is a time-lapse sequence as tube wave energy reverberation impinges on two minor bore hole obstructions and the well bottom hole to create source signatures at the discontinuity locations.

FIG. 7 is a schematic time lapse sequence of tube wave energy reverberating in a well bore 101 or production tubing with two discontinuities or minor bore hole/production tubing obstructions and the well bore bottom converting tube waves to body waves. Body waves are radiated into the surrounding earth formation at each location an obstruction exists in a well bore or production tubing. Each location from which a body wave radiates produces a unique source signature or coda over time. In FIG. 7, there are three locations that produce unique coda, the upper discontinuity 30a, the lower discontinuity 30b, and the bottom of the well bore 113.

In FIG. 7 at arbitrary time TI tube wave energy 103 impinges on the upper discontinuity 30a and body wave energy 106 emanates from the well bore/production tubing. At time T2 the tube wave energy reverberates up 107 and down 109 along the well bore/production tubing away from the upper discontinuity. At time T3 the down going tube wave reverberation energy 115 impinges on the lower discontinuity 30b and part of the energy is converted to body wave energy 117 radiating into the surrounding earth formation. At time T4 the tube wave energy reverberates up 119 and down 121 along the well bore/production tubing from the lower discontinuity 30b. At time T5 the down going tube wave energy 123 impinges on the bottom of the well bore/production tubing 113 where part of the energy is converted to body wave energy 125. The up going energy 127 impinges on the upper obstruction 30a where some of the energy is converted to body waves 129. At time T6 tube wave energy 131 is reflected or diffracted off of the well bore/production tubing bottom 113 and moves up the well bore fluid column. Also at T6 energy has likewise been separated into down going energy 133 and up going energy 135 by discontinuity 30a.

Each discontinuity produces its own source signal coda based on the time body waves emanate from the well bore/production tubing at each discontinuity or bottom hole location. For instance, the coda produced at discontinuity 30a in FIG. 2 contains body wave energy produced at arbitrary time steps T1 and T5. The coda produced at discontinuity 111 will contain body wave energy transmitted at arbitrary time step T3. The coda generated by body waves transmitted from the bottom of the well bore 113 will contain energy at time step T5. These coda, or source signature patterns, are cross correlated with the received acoustic wave field to form an image of the subsurface as is well known in the art, and to determine parameters of interest in the earth formation the body wave energy has transited through.

Figure 8:
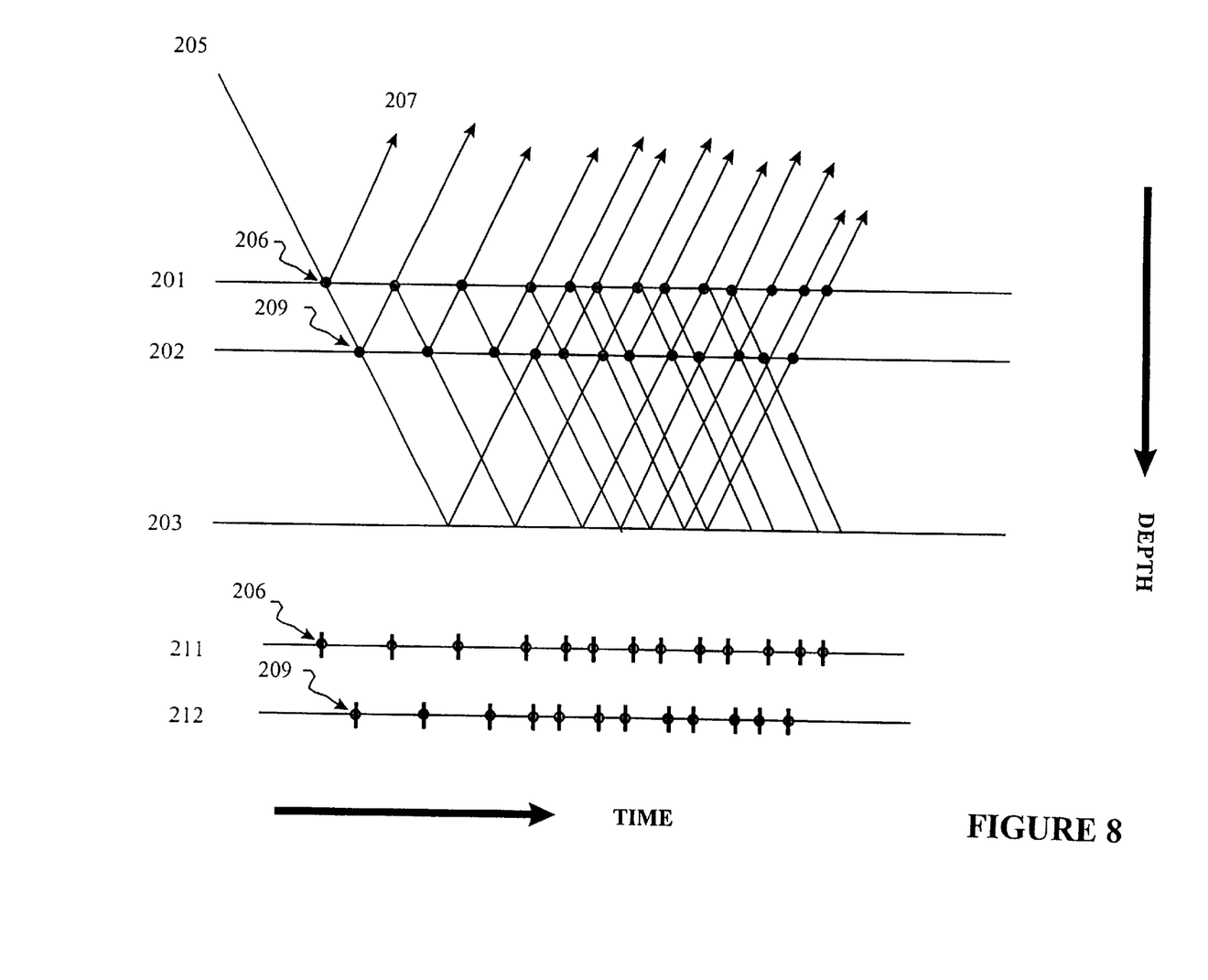
FIG. 8 is a schematic simulation of a tube waves creating variable codas or source signatures.

FIG. 8 is a schematic tube wave simulation demonstrating how waveform coda are produced over time. Each discontinuity will have a unique waveform coda that will be the source signature for the seismic energy emanating into the surrounding earth from that discontinuity location. FIG. 8 contains two discontinuities and a bottom hole. The discontinuities shown vertically in depth are labeled in 201, 202 and the bottom hole is 203. The horizontal axis represents time. A tube wave 205 travels down to discontinuity 201 where some of the energy is converted to body waves at the point in time represented by the dot 206. At 206 the energy not converted into body wave energy splits into up going tube wave energy 207 and down going tube wave energy which travels to the first dot 209 on the next lower discontinuity 202. At 209 some energy is converted to body wave energy imparted to the surrounding formation, other energy remains as tube wave energy, some traveling up to the discontinuity 201 and other energy going toward the bottom hole 203.

Codas for discontinuity 201 and 202 are shown, and the bottom hole 203 is included to show how reverberation from other discontinuities influence coda generation. The coda for discontinuity 201 is shown below the simulation model at 211. Dot 206, the first body wave conversion is shown, followed in time by all the other body wave generation time points. The vertical bars through the dots of coda 211 represent the time body waves are generated at the discontinuity 201. The coda for discontinuity 202 is represented by 212, again with 209 representing the first body wave conversion from tube wave energy occurring for discontinuity 202. The codas are unique to each discontinuity, although each coda is affected by the output of every other discontinuity in the bore hole/production tubing. The coda for the bottom hole is not shown. The coda for the bottom of the hole is always nearly equal to the deepest discontinuity 202 in the series. Thus, the coda for the bottom of the hole 203 and the deepest obstruction 202 are temporally indistinguishable in the far field unless the deepest obstruction 202 is placed very close to the bottom of the hole so that the coda for the deepest obstruction and the coda for the bottom of the hole appear as single complex coda or the deepest obstruction is placed sufficiently distant from the bottom of the hole so that the codas appear temporally distinct.

In FIG. 8 the initial tube wave 205 may be generated with an impulsive source such as an airgun or with a swept frequency source, but any seismic or acoustic source may be used, such as a seismic source attached to an autonomous carrier of the present invention. Tube wave energy may be generated by many different methods, all of which are amenable for use with this invention.

In the preferred embodiment a receiver is placed near a discontinuity to record the coda associated with the discontinuity. However, there are other methods of determining or measuring coda, and receivers are not required to directly measure the coda for every discontinuity.

Figure 9:
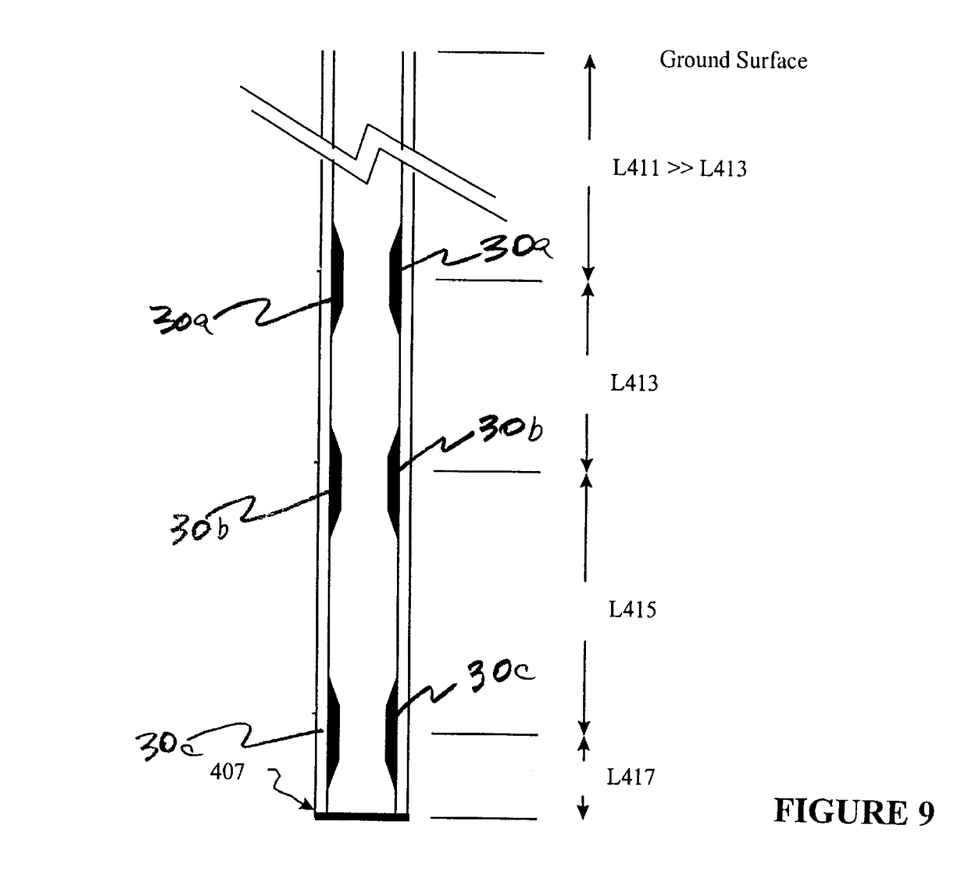
FIG. 9 is a diagram of minor bore hole obstructions as they are placed in a well bore.

As shown in FIG. 9, the discontinuities may be spaced or driven to arbitrarily locations along the well bore/production tubing. In FIG. 9, the lengths between autonomous moveable obstruction source/receiver discontinuities 30a, 30b, 30c and bottom hole 407 are not necessarily equal. So, in the FIG. 9 example, length L411≠L413≠L415≠L417. Closely spaced discontinuities may appear as a point source in the far field. For example the energy received by receivers from discontinuity 30c and the bottom hole 407, as shown in FIG. 9, can appear as a point source in the far field.

The discontinuities or minor bore hole obstructions may be restrictions, as shown by discontinuities 30a, 30b and 30c in FIG. 9.

Figure 10:
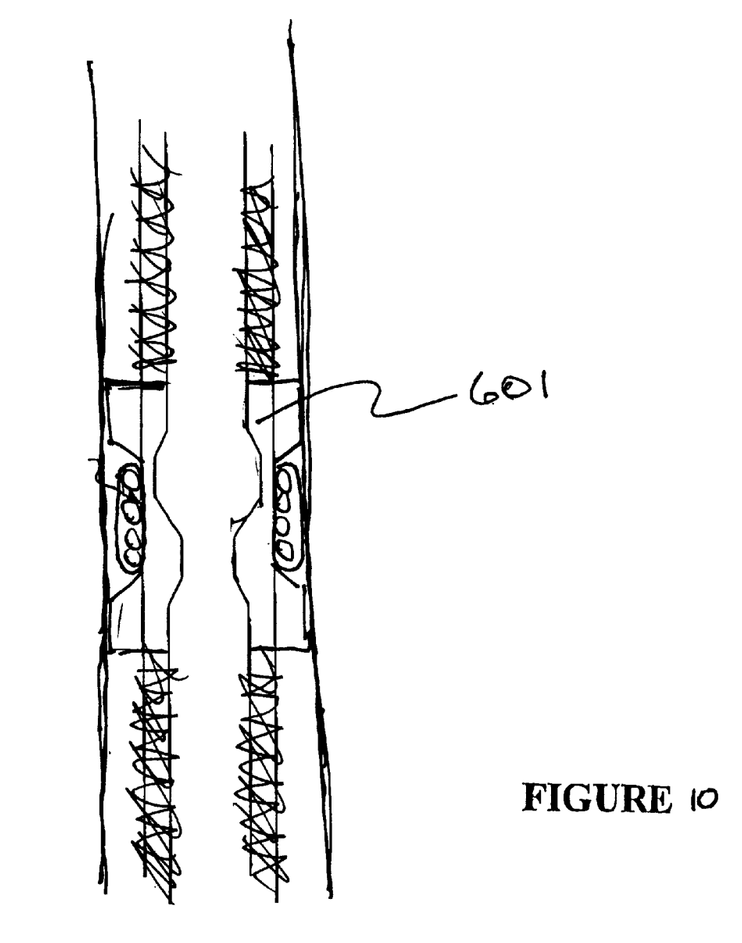
FIG. 10 is design for a complex bore hole discontinuity.

In an alternative embodiment, complex and arbitrary shapes, as shown by autonomous moveable discontinuity source/receiver 601 in FIG. 10, may be designed to increase the variability of the source signature as well as to change the effective bandwidth of the radiated signal. Special shapes of discontinuities may be used, for instance an inverse Venturi configuration. The distances separating the minor borehole obstructions along the well bore may be spaced equally if such such complex distinct obstruction are used.

Each discontinuity is a separate source of body wave energy and each discontinuity has a unique source coda or signature. For this example, we assume a seismic sensor for measuring the coda has been placed in the carrier or movable obstruction, but this is not a limitation on the invention, as methods other than direct near-source measurement for detecting source signatures are known.

Each moveable discontinuity or minor bore hole/production tubing obstruction is an energy radiation source point with a unique waveform coda for acoustic energy radiated into the adjacent earth formation. The coda is generated from a sensor which is in or near the moveable obstruction or estimated from field measurements. A sensor is placed to record the waveform coda as it is generated. Each coda is then cross correlated with the acoustic wave field recorded away from the well bore/production tubing, for instance with seismic sensors in another well bore or on the surface of the earth or the ocean floor.

Figure 11:
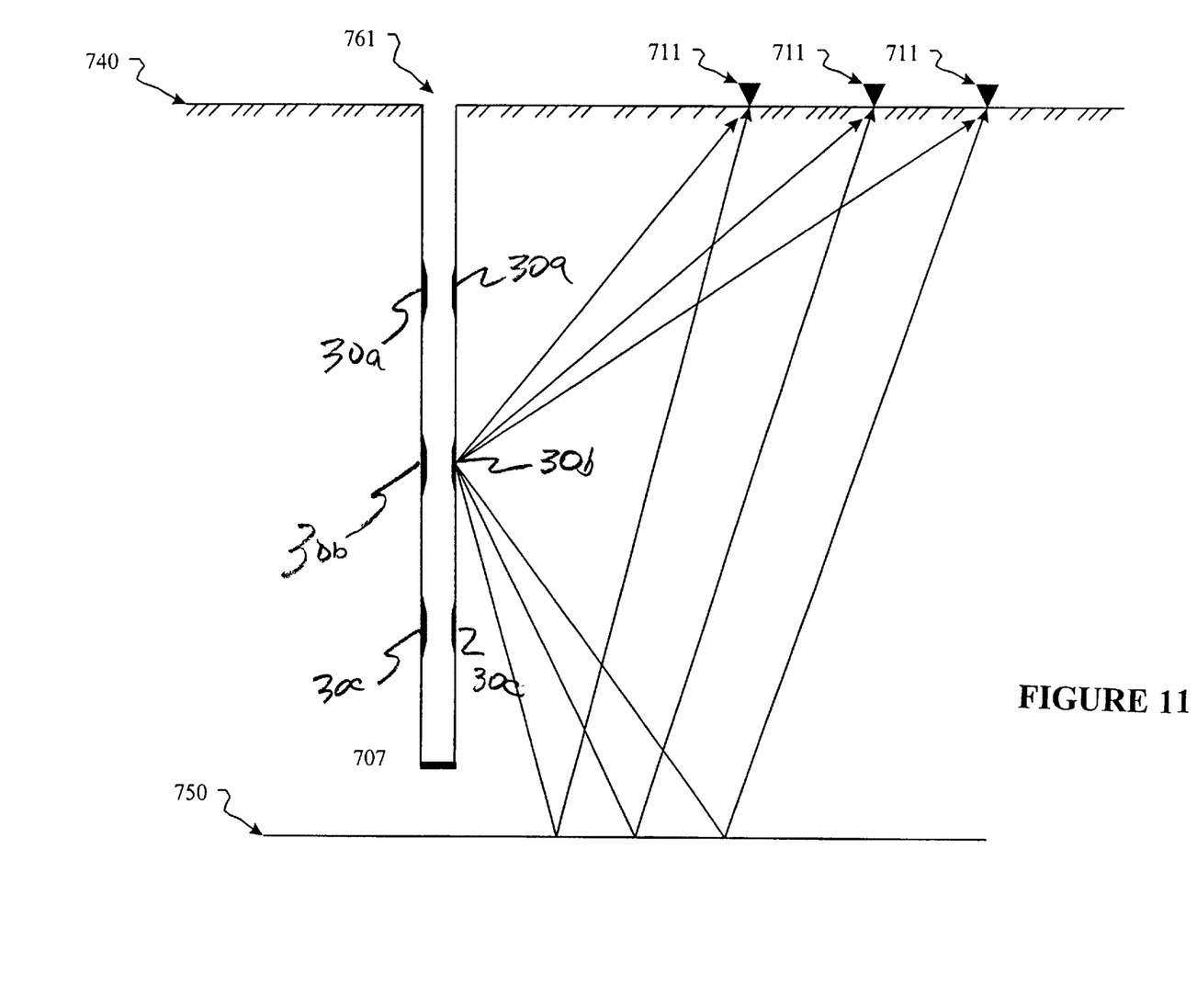
FIG. 11 is a schematic of a Reverse VSP type project utilizing the invention.

The invention may be used with a reverse VSP type project as shown schematically in FIG. 11. A well or production tubing 761 has autonomous moveable obstruction source/receiver discontinuities 30a, 30b, 30c and well bottom 707 from which body waves may radiate into the surrounding earth formation. As shown by lines originating at discontinuity 30b, body wave energy may travel directly to earth surface 740 where sensors 711 receive the energy. Body wave energy originating at, for instance, discontinuity 30b may reflect or refract off of geologic interfaces 750 in the earth. Body wave energy may emanate from any of the discontinuities, 30*a*, 30*b*, 30*c* or 707, which also may have associated sensors to directly measure the associated source waveform coda or seismic energy received from any other source point.

Figure 12:
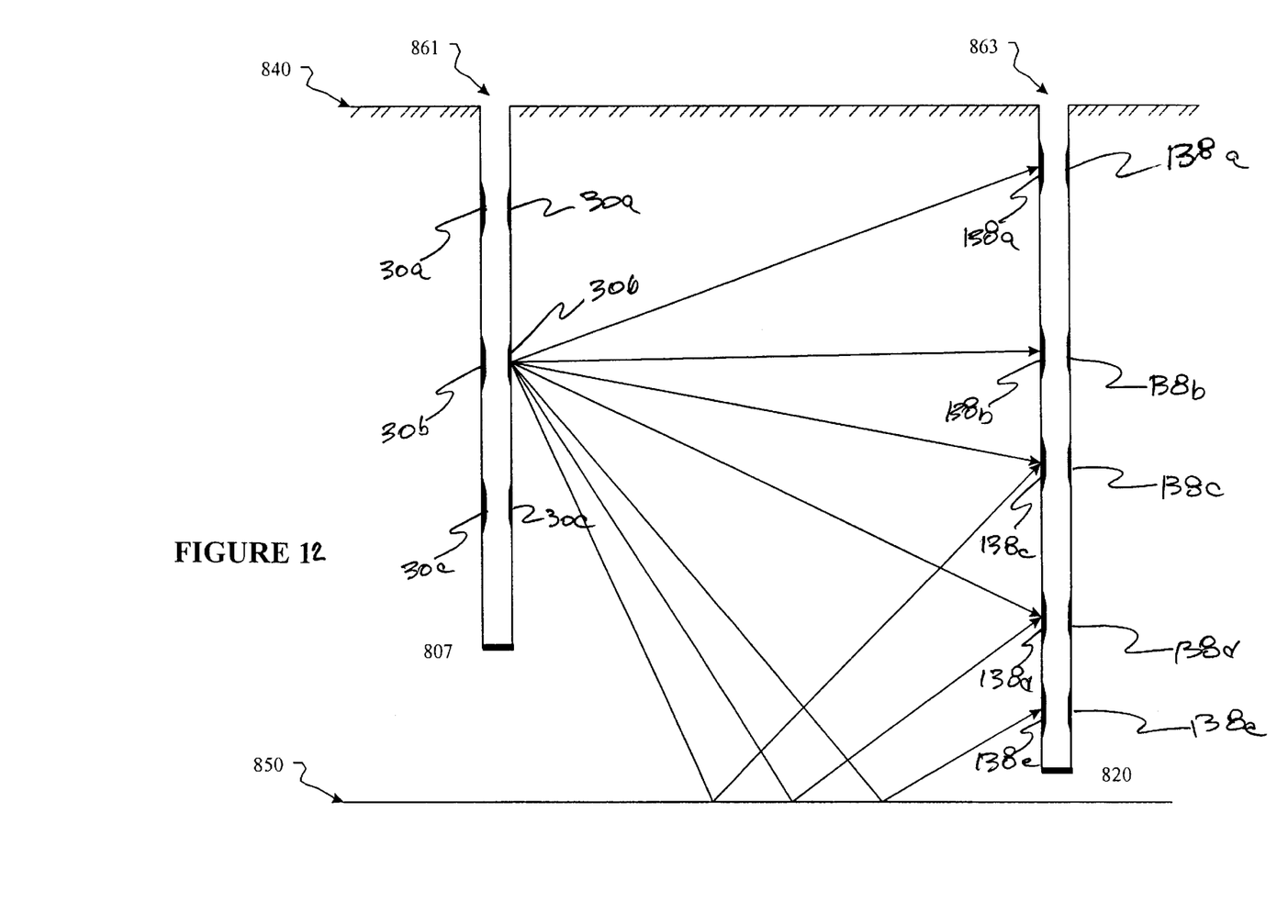
FIG. 12 is a schematic of a Cross-Well application type project utilizing the invention.

Cross-well type projects may be undertaken with this invention as shown in FIG. 12. A source well 861 will contain source point autonomous moveable obstruction source/receiver discontinuities 30*a*, 30*b*, 30*e* and 807 or combinations of discontinuities appearing as source points in the far field. Body waves will be converted from tube waves at these discontinuities. A cross-well project will have at least one receiver well 863 containing receivers or receiver with source-point discontinuity combinations 138*a*, 138*b*, 138*c*, 138*d*, 138*e* and 820. The receivers are carried by the automonous carriers of the present invention. A few possible wave paths are shown by the lines originating at discontinuity 30*b*. The body wave energy may travel directly to a receiver or a receiver-discontinuity combination 138*c*, 138*d* and 138*e* in another well 863. The body wave energy may reflect or refract off of geologic interfaces 850 in the subsurface before being received by receivers or receiver-discontinuity combinations 815, 817 and 819. As is well understood in the art, many other body wave paths traversing intervening earth formations containing useful information will be received at sensors in a cross-well type project. See, e.g., U.S. Pat. No. 5,886,255, incorporated herein by reference in its entirety.

Figure 13:
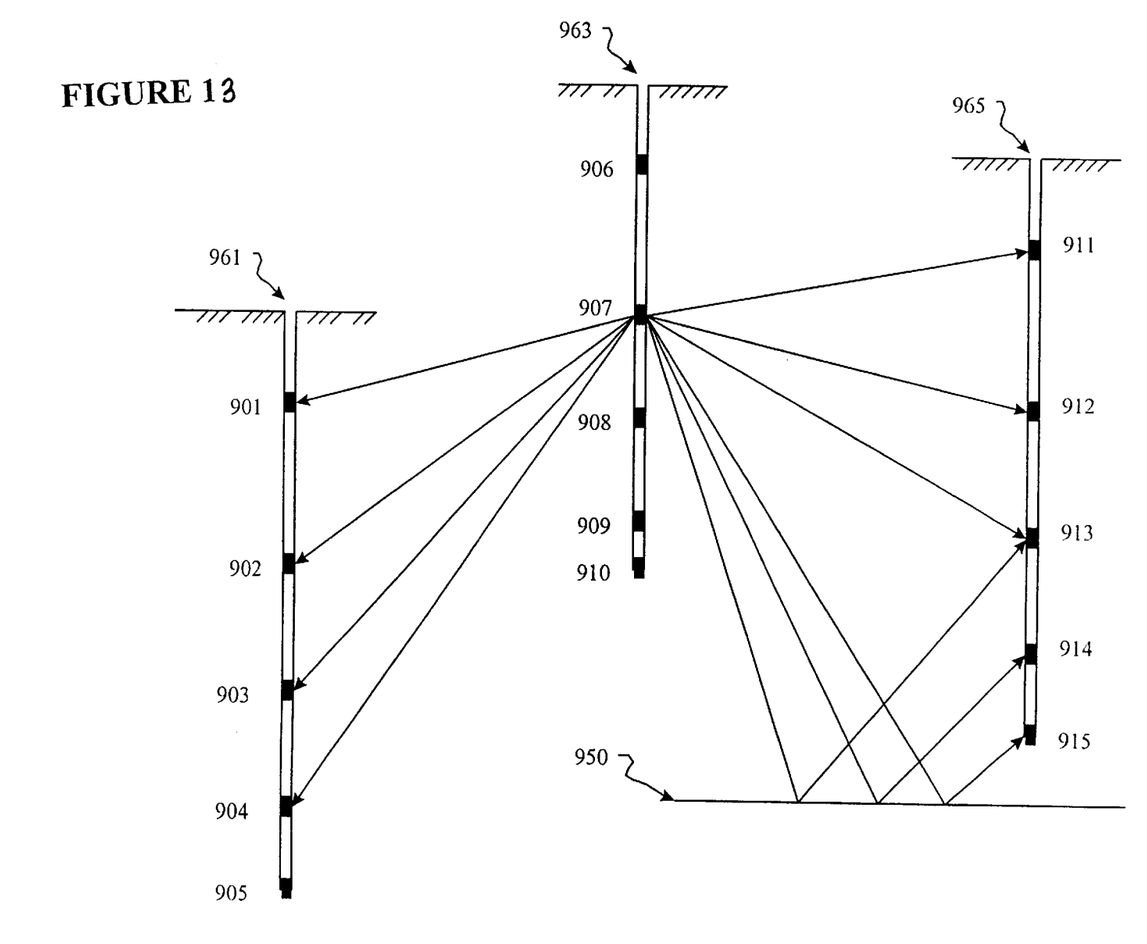
FIG. 13 is a schematic of a Multi-Well Cross-Well application type project utilizing the invention.

The cross-well project may be a multi-well project so that many bore holes may be utilized to simultaneously record body wave energy emanating from a source well 963 as shown in FIG. 13. The well 963 will have source and receiver points formed by moveable obstruction source/ receivers 906, 907, 908, 909 and 910 for example. Other wells 961, 965 will contain sources and receivers along the well bores 901 through 905, and 911 through 915 respectively. Example body wave ray paths are shown originating at source point 907. The ray paths may be direct as shown between the source well 963 and receiver well 961. The ray paths may be combinations of reflected energy off of a geologic interface 950 with direct ray paths as shown by energy emanating at source well 963 and being received by receiver well 965. See, e.g., U.S. Pat. No. 5,866,225.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes. As the foregoing examples demonstrate, this method may be used for hydrocarbon or other mineral deposit assessment at any point in time, over several time periods, and may be utilized as an ongoing part of the management and monitoring of a producing reservoir. Time varying changes of selected attributes of those acoustic waves that have transited the earth formation between bore holes are indicative of the temporal changes in the mineral content. The invention allows for constant assessment of production and resource management during the productive life of oil, gas or other mineral deposits. Hydrocarbon migration during production, secondary recovery methods, steam flood progression, water invasion into oil and gas reservoirs are all examples of reservoir characteristics that may be monitored over time with this invention.

What is claimed is:

1. A system for acquiring seismic data from a well bore in a subsurface formation in response to acoustic signals induced in the formation, comprising:

an autonomous carrier in the well bore, the carrier adapted carry a moveable obstruction, along at least a portion of a well bore; and a sensor for detecting a response seismic signal in response to acoustic source signals induced in the subsurface formation by the moveable obstruction.

2. The system of claim 1 wherein the carrier provides a moveable obstruction for converting a tube wave in the well bore to a body wave which radiates into the surrounding formation acoustic seismic signal.

3. The system of claim 2 further comprising:

a two-way communication link for providing data communication between a surface location and a receiver unit in the well bore for providing location control instructions to the carrier; and a surface control unit for receiving the seismic data recovered by the receiver unit in the well bore over the two-way communication link.

4. The system of claim 2 wherein the at least one carrier stops at selected spaced apart locations in the well bore to convert tube waves to body waves which radiate into the formation adjacent the well bore.

5. The system of claim 3 wherein the carrier further includes a control circuit that controls the movement of the carrier in the well bore.

6. The system of claim 3 wherein a receiver unit controls the movement of the carrier in the well bore.

7. The system of claim 3 wherein the receiver unit controls the movement of the carrier in the well bore in response to command signals transmitted by a surface control unit to the receiver unit.

8. The system of claim 3 wherein the carrier includes a control circuit having a microprocessor and at least one memory unit carrying a program therein for use by the microprocessor.

9. The system of claim 3 wherein the location control instructions are upgraded by a receiver unit.

10. The system of claim 1 wherein the carrier is an autonomous device that can move along a portion of the well bore on its own power according to programmed instructions stored on the carrier.

11. The system of claim 1 wherein the well bore is formed from an ocean bottom.

12. The system of claim 11 further comprising a carrier deployed at the ocean bottom further comprising an attached seismic source for generating seismic signals.

13. The system of claim 12 further comprising a receiver unit at the ocean bottom for retrieving seismic data from a carrier comprising a sensor at the ocean bottom.

14. The system of claim 13 further comprising a third receiver at the surface for receiving seismic data from the receiver unit in the well bore and a second receiver unit at the ocean bottom.

15. A method for acquiring seismic data from a well bore in a subsurface formation in response to acoustic signals induced in the formation, comprising:

moving an autonomous carrier in the well bore, the carrier adapted carry a moveable obstruction along at least a portion of the well bore; and detecting a response seismic signal in response to acoustic source signals induced in the subsurface formation by the moveable obstruction.

16. The method of claim 15 wherein the carrier provides a moveable obstruction for converting a tube wave in the well bore to a body wave which radiates into the surrounding formation acoustic seismic signal.

17. The method of claim 16 further comprising:

providing a two-way communication link for providing data communication between a surface location and a receiver unit in the well bore for providing location control instructions to the carrier; and providing a surface control unit for receiving the seismic data recovered by the receiver unit in the well bore over the two-way communication link.

18. The method of claim 16 wherein the at least one carrier stops at selected spaced apart locations in the well bore to convert tube waves to body waves which radiate into the formation adjacent the well bore.

19. The method of claim 17 wherein the carrier further includes a control circuit that controls the movement of the carrier in the well bore.

20. The method of claim 17 wherein a receiver unit controls the movement of the carrier in the well bore.

21. The method of claim 17 wherein the receiver unit controls the movement of the carrier in the well bore in response to command signals transmitted by a surface control unit to the receiver unit.

22. The method of claim 17 wherein the carrier further comprises a control circuit having a microprocessor and at least one memory unit carrying a program therein for use by the microprocessor.

23. The method of claim 17 wherein the location control instructions are upgraded by a receiver unit.

24. The method of claim 15 wherein the carrier is an autonomous device that can move along a portion of the well bore on its own power according to programmed instructions stored on the carrier.

25. The method of claim 15 wherein the well bore is formed from an ocean bottom.

26. The method of claim 25 further comprising:

providing a carrier deployed at the ocean bottom further comprising an attached seismic source for generating seismic signals.

27. The method of claim 26 further comprising:

providing a receiver unit at the ocean bottom for retrieving seismic data from a carrier comprising a sensor at the ocean bottom.

28. The method of claim 27 further comprising:

providing a third receiver at the surface for receiving seismic data from the receiver unit in the well bore and a second receiver unit at the ocean bottom.

* * * * *